United States Patent
Choi et al.

(10) Patent No.: US 10,326,162 B2
(45) Date of Patent: Jun. 18, 2019

(54) COMPOSITE SOLID ELECTROLYTE COMPRISING SILANE COMPOUND AND LITHIUM BATTERY COMPRISING THE COMPOSITE SOLID ELECTROLYTE

(71) Applicant: Samsung Electronics Co., Ltd., Suwon-si, Gyeonggi-do (KR)

(72) Inventors: Wonsung Choi, Seoul (KR); Mokwon Kim, Suwon-si (KR); Sangbok Ma, Suwon-si (KR); Kyounghwan Choi, Suwon-si (KR); Myungjin Lee, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 76 days.

(21) Appl. No.: 15/709,932

(22) Filed: Sep. 20, 2017

(65) Prior Publication Data

US 2018/0351202 A1   Dec. 6, 2018

(30) Foreign Application Priority Data

Jun. 2, 2017 (KR) .................. 10-2017-0069075

(51) Int. Cl.
*H01M 10/056* (2010.01)
*H01M 10/0525* (2010.01)
(Continued)

(52) U.S. Cl.
CPC ....... *H01M 10/0525* (2013.01); *H01M 4/382* (2013.01); *H01M 4/405* (2013.01);
(Continued)

(58) Field of Classification Search
CPC ..... H01M 10/0525; H01M 2300/0091; H01M 10/056
See application file for complete search history.

(56) References Cited

U.S. PATENT DOCUMENTS 8,501,339 B2   8/2013   Visco et al.
8,623,557 B2   1/2014   Skotheim et al.
(Continued)

FOREIGN PATENT DOCUMENTS

JP   2010033732 A   2/2010
JP   2012009255 A   1/2012
(Continued)

OTHER PUBLICATIONS

Morimoto et al., "Preparation of lithium ion conducting solid electrolyte of NASICON-type Li1+xAlxTi2-x(PO4)3 (x=0.3) obtained by using the mechanochemical method and its application as surface modification materials of LiCoO2 cathode for lithium cell", Journal of Power Sources, 240, 2013, 636-643.

(Continued)

*Primary Examiner* — Stewart A Fraser
(74) *Attorney, Agent, or Firm* — Cantor Colburn LLP

(57) ABSTRACT

A composite solid electrolyte, including: a lithium ion conductor, and a coating layer on the lithium ion conductor, the coating layer including a silane compound represented by Formula 1:

$$(-O)_y-Si-(R_1)_x \qquad \text{Formula 1}$$

wherein, in Formula 1,
$1 \leq x \leq 3$; $1 \leq y \leq 3$; $x+y=4$;
$R_1$ is hydrogen, a halogen, a substituted or unsubstituted $C_1$-$C_{30}$ alkyl group, a substituted or unsubstituted $C_2$-$C_{30}$ alkenyl group, a substituted or unsubstituted $C_2$-$C_{30}$ alkynyl group, a substituted or unsubstituted $C_6$-$C_{30}$ aryl group, a substituted or unsubstituted $C_6$-$C_{30}$ aryloxy group, a substituted or unsubstituted $C_7$-$C_{30}$ arylalkyl group, a substituted or unsubstituted $C_2$-$C_{30}$ heteroaryl group, a substituted or unsubstituted $C_2$-$C_{30}$ heteroaryloxy group, a substituted or unsubstituted $C_3$-$C_{30}$ heteroarylalkyl group, a substituted or (Continued)

unsubstituted $C_4$-$C_{30}$ carbocyclic group, a substituted or unsubstituted $C_5$-$C_{30}$ carbocyclic alkyl group, a substituted or unsubstituted $C_2$-$C_{30}$ heterocyclic group, or a substituted or unsubstituted $C_2$-$C_{30}$ heterocyclic alkyl group.

20 Claims, 6 Drawing Sheets

(51) Int. Cl.
  *H01M 10/0564* (2010.01)
  *H01M 4/38* (2006.01)
  *H01M 4/40* (2006.01)
  *H01M 10/052* (2010.01)
  *H01M 10/0585* (2010.01)
  *H01M 12/08* (2006.01)

(52) U.S. Cl.
  CPC ....... *H01M 10/052* (2013.01); *H01M 10/056* (2013.01); *H01M 10/0564* (2013.01); *H01M 10/0585* (2013.01); *H01M 12/08* (2013.01); H01M 2300/0068 (2013.01); H01M 2300/0077 (2013.01); H01M 2300/0082 (2013.01); H01M 2300/0091 (2013.01); H01M 2300/0094 (2013.01)

(56) References Cited

U.S. PATENT DOCUMENTS

| | | |
|---|---|---|
| 8,951,678 B2 | 2/2015 | Jeong et al. |
| 9,887,417 B2 | 2/2018 | Miki et al. |
| 9,966,644 B2 | 5/2018 | Roev et al. |
| 10,069,132 B2 | 9/2018 | Lee et al. |
| 2010/0143771 A1 | 6/2010 | Jeong et al. |
| 2011/0059369 A1* | 3/2011 | Nan .................. H01M 10/0525 429/322 |
| 2012/0328958 A1 | 12/2012 | Jeong et al. |
| 2015/0057824 A1 | 2/2015 | Gheerardyn et al. |
| 2016/0064785 A1 | 3/2016 | Kim et al. |
| 2016/0322666 A1 | 11/2016 | Kim et al. |

FOREIGN PATENT DOCUMENTS

| | | |
|---|---|---|
| JP | 2014011028 A | 1/2014 |
| JP | 2014203595 A | 10/2014 |
| JP | 2015176857 A | 10/2015 |
| KR | 1020130000227 A | 1/2013 |
| KR | 101397796 B1 | 5/2014 |
| KR | 101440886 B1 | 9/2014 |
| KR | 101569136 B1 | 11/2015 |
| KR | 101601511 B1 | 3/2016 |
| KR | 1020160029177 A | 3/2016 |
| KR | 1020160031828 A | 3/2016 |
| KR | 1020160128670 A | 11/2016 |

OTHER PUBLICATIONS

Yang et al, "Control of interface of glass-ceramic electrolyte/liquid electrolyte for aqueous lithium batteries", Journal of Power Sources, 244, 2013, 43-49.

\* cited by examiner

COMPOSITE SOLID ELECTROLYTE COMPRISING SILANE COMPOUND AND LITHIUM BATTERY COMPRISING THE COMPOSITE SOLID ELECTROLYTE

CROSS-REFERENCE TO RELATED APPLICATION

This application claims priority to and the benefit of Korean Patent Application No. 10-2017-0069075, filed on Jun. 2, 2017, in the Korean Intellectual Property Office, and all the benefits accruing therefrom under 35 U.S.C. § 119, the content of which is incorporated herein by reference in its entirety.

BACKGROUND

1. Field

The present disclosure relates to a composite solid electrolyte including a silane compound, and a lithium battery including the composite solid electrolyte.

2. Description of the Related Art

Lithium batteries, for example, lithium secondary batteries, are high-performance secondary batteries having a high energy density relative to other types of commercially available secondary batteries. Lithium secondary batteries may be used in a variety of fields, such as electric vehicles and energy storage devices.

There is an increased demand for solid electrolytes which are advantageous in terms of safety and which enable a long lifespan of a lithium battery. A suitable solid electrolyte has high lithium ion conductivity and good stability when in contact with negative and/or positive active materials.

There remains a need for an improved solid electrolyte and a lithium battery including the novel solid electrolyte.

SUMMARY

Provided is a novel composite solid electrolyte.

Provided is a method of preparing the composite solid electrolyte.

Provided also is a lithium battery including the composite solid electrolyte.

According to an aspect of an embodiment, a composite solid electrolyte includes:

a lithium ion conductor, and a coating layer on the lithium ion conductor, the coating layer including a silane compound represented by Formula 1:

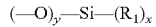  Formula 1 wherein, in Formula 1, x is an integer satisfying 1≤x≤3; y is an integer satisfying 1≤y≤3; x+y=4;

$R_1$ is each independently hydrogen, a halogen, a substituted or unsubstituted $C_1$-$C_{30}$ alkyl group, a substituted or unsubstituted $C_2$-$C_{30}$ alkenyl group, a substituted or unsubstituted $C_2$-$C_{30}$ alkynyl group, a substituted or unsubstituted $C_6$-$C_{30}$ aryl group, a substituted or unsubstituted $C_6$-$C_{30}$ aryloxy group, a substituted or unsubstituted $C_7$-$C_{30}$ arylalkyl group, a substituted or unsubstituted $C_2$-$C_{30}$ heteroaryl group, a substituted or unsubstituted $C_2$-$C_{30}$ heteroaryloxy group, a substituted or unsubstituted $C_3$-$C_{30}$ heteroarylalkyl group, a substituted or unsubstituted $C_4$-$C_{30}$ carbocyclic group, a substituted or unsubstituted $C_5$-$C_{30}$ carbocyclic alkyl group, a substituted or unsubstituted $C_2$-$C_{30}$ heterocyclic group, or a substituted or unsubstituted $C_2$-$C_{30}$ heterocyclic alkyl group.

According to an aspect of another embodiment, a method of preparing a composite solid electrolyte includes:

providing a mixed solution comprising a silane compound represented by Formula 1a, a lithium ion conductor, and a solvent;

stirring the mixed solution; and drying the mixed solution:

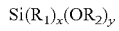  Formula 1a wherein, in Formula 1a, x is an integer satisfying 0≤x≤4; y is an integer satisfying 0≤y≤4; x+y=4;

$R_1$ and $R_2$ are each independently hydrogen, a halogen, a substituted or unsubstituted $C_1$-$C_{30}$ alkyl group, a substituted or unsubstituted $C_2$-$C_{30}$ alkenyl group, a substituted or unsubstituted $C_2$-$C_{30}$ alkynyl group, a substituted or unsubstituted $C_6$-$C_{30}$ aryl group, a substituted or unsubstituted $C_6$-$C_{30}$ aryloxy group, a substituted or unsubstituted $C_7$-$C_{30}$ arylalkyl group, a substituted or unsubstituted $C_2$-$C_{30}$ heteroaryl group, a substituted or unsubstituted $C_2$-$C_{30}$ heteroaryloxy group, a substituted or unsubstituted $C_3$-$C_{30}$ heteroaryl alkyl group, a substituted or unsubstituted $C_4$-$C_{30}$ carbocyclic group, a substituted or unsubstituted $C_5$-$C_{30}$ carbocyclic alkyl group, a substituted or unsubstituted $C_2$-$C_{30}$ heterocyclic group, or a substituted or unsubstituted $C_2$-$C_{30}$ heterocyclic alkyl group According to an aspect of another embodiment, a lithium battery includes: a positive electrode; a negative electrode including a lithium metal or a lithium alloy; and the above-described composite solid electrolyte disposed between the positive electrode and the negative electrode.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which.

Figure 8:
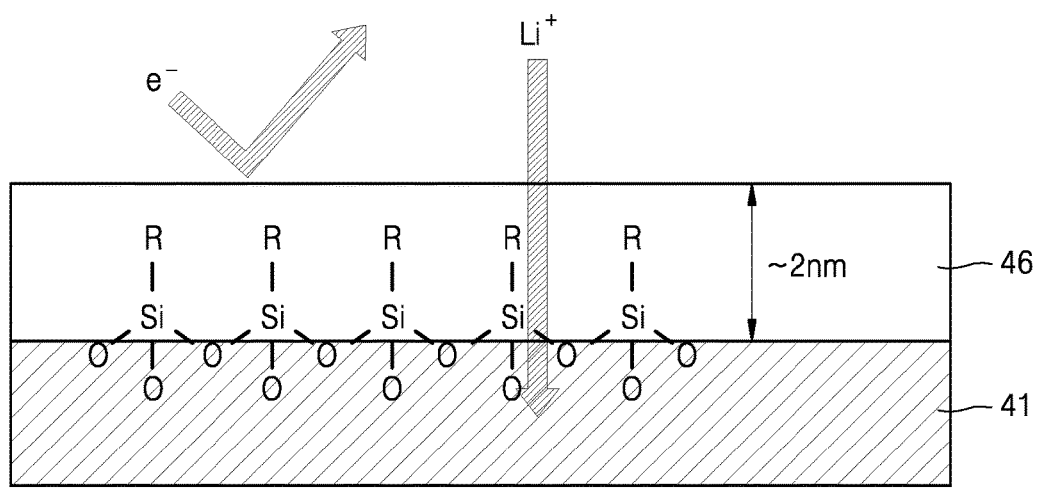
Figure 9:
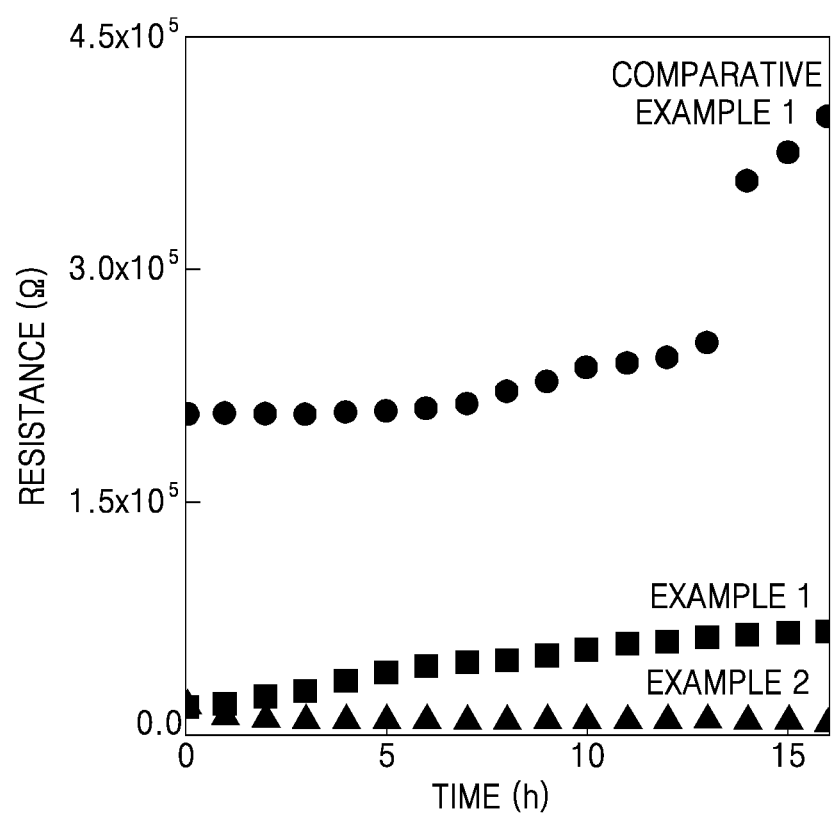
Figure 10:
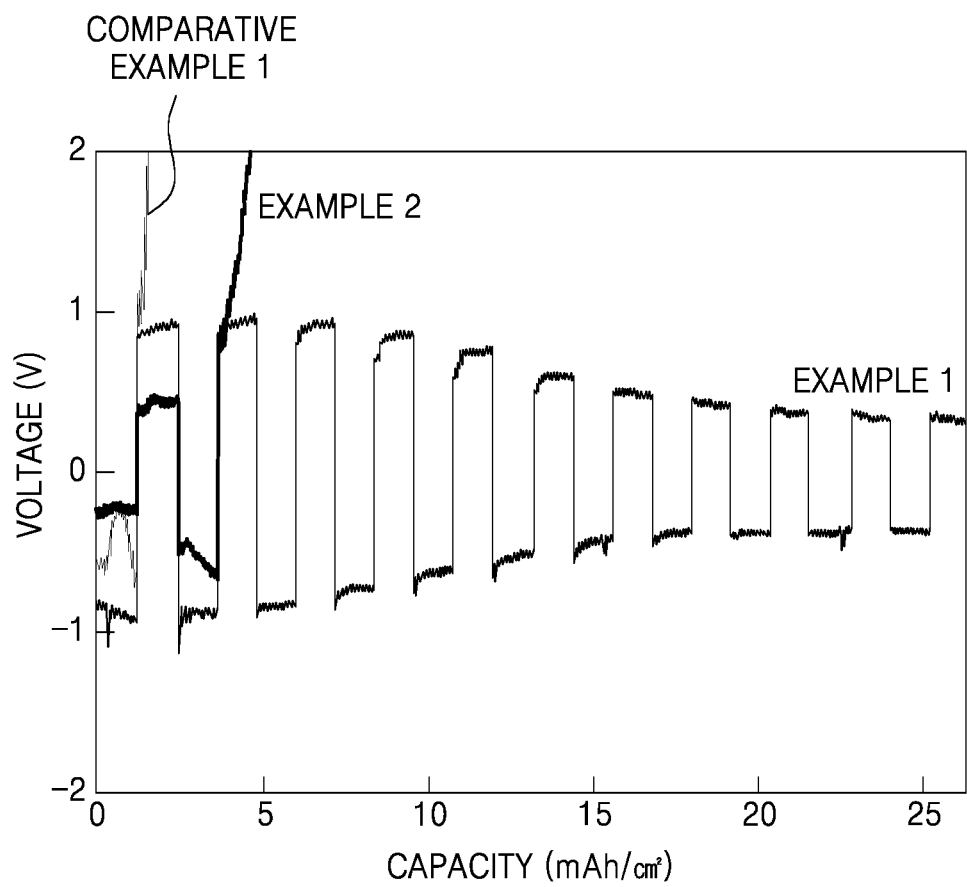

spectra of the composite solid electrolytes prepared according to Preparation Example 1, Preparation Example 2, and Preparation Example 6;

FIG. 8 is a schematic view illustrating the reduction resistance of the composite solid electrolytes prepared according to Preparation Examples 1 and 2;

FIG. 9 is a graph of interfacial resistance (ohms, Ω) versus charging time (hours, h) in the lithium symmetric cells of Examples 1 and 2 and Comparative Example 1; and FIG. 10 is a graph of voltage (V) versus capacity (milliampere hours per square centimeter, $mAh/cm^2$), illustrating charge-discharge characteristics of the lithium symmetric cells of Examples 1 and 2 and Comparative Example 1

DETAILED DESCRIPTION

Reference will now be made in detail to embodiments of a composite solid electrolyte, a method of preparing the composite solid electrolyte, and a lithium battery including the composite solid electrolyte, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Composite Solid Electrolyte

In general, solid electrolytes may be classified into ceramic solid electrolytes and polymer solid electrolytes. Ceramic solid electrolytes may also be further classified into sulfide solid electrolytes and oxide solid electrolytes. Of oxide solid electrolytes, a lithium-aluminum-germanium-phosphate (LAGP) solid electrolyte and a lithium-aluminum-titanium-phosphate (LATP) solid electrolyte having a sodium (Na) superionic conductor ("NASICON") crystalline structure are often used. These solid electrolytes have high ion conductivity and are stable in atmospheric moisture, but may be vulnerable to an interfacial side reaction when they come in contact with a lithium metal electrode, leading to reduced lithium ion conductivity resulting from the reduction reaction, and a considerably high initial resistance.

In a lithium battery, a solid electrolyte potentially has increased electrochemical safety and stability compared to a combustible liquid electrolyte. A lithium battery using a lithium metal or lithium alloy as a negative electrode may have a specific capacity that is about 10 times higher than a graphite negative electrode. However, when a lithium battery includes both a solid electrolyte and a lithium metal or a lithium alloy, an interfacial side reaction may occur in an interface between the solid electrolyte and the lithium metal electrode, which are in contact with each other, leading to reduced lithium ion conductivity due to a reduction reaction, and a considerably high initial resistance. For use in the field of electric vehicles, a lithium battery including a solid electrolyte having high ion conductivity is desired.

In this regard, the inventors of the present application have advantageously discovered a composite solid electrolyte which is resistant to a reduction reaction.

According to an aspect of the present inventive concept, a composite solid electrolyte includes a lithium ion conductor, and a coating layer on the lithium ion conductor, the coating layer including a silane compound represented by Formula 1:

$$(-O)_y-Si-(R_1)_x \qquad \text{Formula 1}$$

In Formula 1, x may be an integer satisfying $1 \leq x \leq 3$; y may be an integer satisfying $1 \leq y \leq 3$; $x+y=4$; and $R_1$ may each independently be hydrogen, a halogen, a substituted or unsubstituted $C_1$-$C_{30}$ alkyl group, a substituted or unsubstituted $C_2$-$C_{30}$ alkenyl group, a substituted or unsubstituted $C_2$-$C_{30}$ alkynyl group, a substituted or unsubstituted $C_6$-$C_{30}$ aryl group, a substituted or unsubstituted $C_6$-$C_{30}$ aryloxy group, a substituted or unsubstituted $C_7$-$C_{30}$ arylalkyl group, a substituted or unsubstituted $C_2$-$C_{30}$ heteroaryl group, a substituted or unsubstituted $C_2$-$C_{30}$ heteroaryloxy group, a substituted or unsubstituted $C_3$-$C_{30}$ heteroarylalkyl group, a substituted or unsubstituted $C_4$-$C_{30}$ carbocyclic group, a substituted or unsubstituted $C_5$-$C_{30}$ carbocyclic alkyl group, a substituted or unsubstituted $C_2$-$C_{30}$ heterocyclic group, or a substituted or unsubstituted $C_2$-$C_{30}$ heterocyclic alkyl group.

For example, $R_1$ may each independently be a fluorine atom, a $C_1$-$C_{30}$ alkyl group substituted with fluorine, and a $C_6$-$C_{30}$ aryl group substituted with fluorine. The $C_1$-$C_{30}$ alkyl group and/or the $C_6$-$C_{30}$ aryl group may be partially or fully substituted with fluorine.

The term "substituted" used herein means that the compound or group is substituted with at least one (e.g., 1, 2, 3, or 4) substituents independently selected from a halogen atom, a $C_1$-$C_{20}$ alkyl group substituted with a halogen atom (e.g., $CCF_3$, $CHCF_2$, $CH_2F$, $CCl_3$, or the like), a $C_1$-$C_{20}$ alkoxy group, a $C_2$-$C_{20}$ alkoxyalkyl group, a hydroxyl group, a nitro group, a cyano group, an amino group, an amidino group, a hydrazine, a hydrazone, a carboxyl group or a salt thereof, a sulfonyl group, a sulfamoyl group, a sulfonic acid or a salt thereof, a phosphoric acid or a salt thereof, a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, a $C_7$-$C_{20}$ heteroarylalkyl group, a $C_6$-$C_{20}$ heteroaryloxy group, a $C_6$-$C_{20}$ heteroaryloxyalkyl group, or a $C_6$-$C_{20}$ heteroarylalkyl group, instead of hydrogen, provided that the substituted atom's normal valence is not exceeded.

The term "halogen atom" means one of the elements of Group 17 of the periodic table (e.g., fluorine, chlorine, bromine, iodine, and astatine).

The term "alkyl" used herein refers to a branched or unbranched (straight chain or linear) saturated aliphatic hydrocarbon group having the specified number of carbon atoms and having a valence of at least one. Alkyl groups include, for example, groups having from 1 to 30 carbon atoms (C1 to C30 alkyl). Non-limiting examples of "alkyl" include methyl, ethyl, n-propyl, isopropyl, n-butyl, isobutyl, sec-butyl, n-pentyl, isopentyl, neopentyl, iso-amyl, n-hexyl, 3-methylhexyl, 2,2-dimethylpentyl, 2,3-dimethylpentyl, and n-heptyl.

The term "alkenyl" used herein refers to a branched or unbranched chain hydrocarbon group including at least one carbon-carbon double bond and having a valence of at least one, optionally substituted with one or more substitutents where indicated, provided that the valence of the alkenyl group is not exceeded. Non-limiting examples of the alkenyl group include vinyl, allyl, butenyl, isopropenyl, and isobutenyl.

The term "alkynyl" used herein refers to a branched or unbranched monovalent hydrocarbon group having at least one carbon-carbon triple bond. Non-limiting examples of the alkynyl group include ethynyl, butynyl, isobutynyl, and isopropynyl.

The term "alkoxyl" means an alkyl group that is linked via an oxygen (i.e., —O— alkyl). Nonlimiting examples of C1 to C30 alkoxyl groups include methoxyl groups, ethoxyl groups, propoxyl groups, isobutyloxyl groups, sec-butyloxyl groups, pentyloxyl groups, iso-amyloxyl groups, and hexyloxyl groups The term "aryloxy" may respectively mean an aryl bound to an oxygen atom.

The term "aryl" used herein refers to a hydrocarbon group having an aromatic ring, and includes monocyclic and polycyclic hydrocarbons wherein the additional ring(s) of the polycyclic hydrocarbon may be aromatic or nonaromatic. Non-limiting examples of the aryl group include phenyl, naphthyl, and tetrahydronaphthyl.

The term "heteroaryl" used herein means a monovalent carbocyclic ring that includes one or more aromatic rings, in which at least one ring member is a heteroatom, and the rest of the cyclic atoms are all carbon. The heteroatom(s) are generally independently selected from nitrogen (N), oxygen (O), P (phosphorus), and sulfur (S). In a C2 to C30 heteroaryl group, the total number of ring carbon atoms ranges from 2 to 30, with remaining ring atoms being heteroatoms. The heteroaryl group may include, for example, one to five heteroatoms and may include five- to ten-membered rings. In the heteroaryl group, S or N may be present in oxidized form.

Non-limiting examples of the heteroaryl group may include thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiazolyl, 1,2,3-thiadiazolyl, 1,2,4-thiadiazolyl, 1,2,5-thiadiazolyl, 1,3,4-thiadiazolyl, isothiazol-3-yl, isothiazol-4-yl, isothiazol-5-yl, oxazol-2-yl, oxazol-4-yl group, an oxazol-5-yl group, an isoxazol-3-yl group, an isoxazol-4-yl group, an isoxazol-5-yl, 1,2,4-triazol-3-yl, 1,2,4-triazol-5-yl, 1,2,3-triazol-4-yl, 1,2,3-triazol-5-yl, tetrazolyl, pyrid-2-yl, pyrid-3-yl, 2-pyrazin-2-yl, pyrazin-4-yl, pyrazin-5-yl, 2-pyrimidin-2-yl, 4-pyrimidin-2-yl, and 5-pyrimidin-2-yl.

The term "carbocyclic" used herein may refer to a saturated or partially unsaturated non-aromatic monocyclic, bicyclic or tricyclic hydrocarbon group. Non-limiting examples of the monocyclic hydrocarbon group include cyclopentyl, cyclopentenyl, cyclohexyl, and cyclohexenyl. Non-limiting examples of the bicyclic hydrocarbon group include bornyl, decahydronaphthyl, bicyclo[2.1.1]hexyl, bicyclo[2.2.1]heptyl, bicyclo[2.2.1]heptenyl, and bicyclo [2.2.2]octyl. An example of the tricyclic hydrocarbon group may be, for example, adamantyl.

The term "heterocyclic" used herein may refer to a cyclic hydrocarbon group including at least one heteroatom and 2 to 30 carbon atoms, for example, 5 to 20 carbon atoms, or 5 to 10 carbon atoms. In this regard, the heteroatom may be one selected from sulfur, nitrogen, oxygen, and boron.

"Arylalkyl" means a substituted or unsubstituted aryl group covalently linked to an alkyl group that is linked to a compound (e.g., a benzyl is a C7 arylalkyl group).

The composite solid electrolyte according to an embodiment may be a composite electrolyte that includes a lithium ion conductor and a coating layer including a silane compound, thus remarkably reducing an interfacial resistance between the composite solid electrolyte and a negative electrode of a lithium battery.

The composite solid electrolyte according to an embodiment may have a coating layer including a silane compound on a lithium ion conductor, and thus may have good resistance to reduction and high ion conductivity. Accordingly, a lithium battery including the composite solid electrolyte may operate stably with electrochemical stability.

The coating layer including a silane compound of Formula 1 may have a thickness of about 100 nanometers (nm) nm or less. For example, the coating layer including a silane compound of Formula 1 may have a thickness of about 1 to about 100 nm, and in some embodiments, about 1 to about 80 nm, and in some embodiments, about 1 to about 60 nm, and in some other embodiments, about 1 to about 40 nm, and in some other embodiments, about 1 to about 20 nm, and in still other embodiments, about 1 to about 10 nm. For example, the coating layer including a silane compound of Formula 1 may have a thickness of about 1 to about 5 nm.

When the coating layer including a silane compound of Formula 1 has a thickness within these ranges, an interfacial side reaction between the composite solid electrolyte and a lithium metal as a negative electrode may be suppressed, resulting in reduced interfacial resistance and remarkably improved resistance to reduction.

The lithium ion conductor may be any material having lithium ion conductivity. For example, the lithium ion conductor may include a lithium oxide ion conductor, a lithium phosphate ion conductor, or a lithium nitride ion conductor, or a combination thereof. For example, the lithium ion conductor may be a lithium-lanthanum-titanium-oxide (LLTO, i.e., a lithium lanthanum titanate) having a perovskite structure represented by $Li_{3x}La_{2/3-x}TiO_3$ (wherein 0<x<1), such as $Li_{1/8}La_{5/8}TiO_3$; a lithium-lanthanum-zirconium oxide (LLZO, i.e., a lithium lanthanum zirconate) such as $Li_7La_3Zr_2O_{12}$; a lithium superionic conductor (LISICON) such as $Li_{14}Zn(GeO_4)_4$; a lithium-aluminum-titanium-phosphate (LATP) represented by $Li_{1+x}Al_xTi_{2-x}(PO_4)_3$ (wherein 0<x<1), such as $Li_{1.3}Al_{0.3}Ti_{1.7}(PO_4)_3$; or a lithium-aluminum-germanium-phosphate (LAGP) represented by $Li_{1+x}Al_xGe_{2-x}(PO_4)_3$ (wherein 0<x<1). A combination comprising at least one of the foregoing may also be used.

For example, the lithium ion conductor may be a composite oxide represented by $Li_{1+x+y}Al_xTi_{2-x}Si_yP_{3-y}O_{12}$ (wherein 0≤x≤1, and 0≤y≤1). This composite oxide may be prepared using any suitable method known to those of skill in the art, for example, by calcining a mixture of source compounds including the constituent elements of a target composite oxide, for example, a mixture of a Li-containing compound, an Al-containing compound, a Ti-containing compound, a Si-containing compound, and a P-containing compound. For example, the composite oxide may be prepared by mixing source compounds such as $Li_2CO_3$, $Li_2TiO_3$, $TiO_2$, $H_3PO_4$, $Al_2(CO_3)_3$, $AlPO_4$, $Al(PO_3)_3$, $Al(OH)_3$, $SiO_2$, $NH_4H_2PO_4$, and/or $(NH_4)_2HPO_4$ to obtain a mixture, and calcining the mixture.

The lithium ion conductor may have, for example, an average particle diameter of about 0.1 micrometer (μm) to about 5 μm, or about 0.5 μm to about 2 μm or about 0.75 μm to about 1 μm. As used herein, "average particle diameter" refers to a particle diameter corresponding to 50% of the particles in a distribution curve in which particles are accumulated in the order of particle diameter from the smallest particle to the largest particle and a total number of accumulated particles is 100%. The average particle diameter may be measured by a method known to those of skill in the art, for example, average particle diameter may be measured with a particle size analyzer or may be measured by using a transmission electron microscope (TEM) or a scanning electron microscope (SEM) image.

For example, the composite solid electrolyte including a lithium ion conductor as described above may have a thickness of about 10 to about 1000 μm, and in some embodiments, about 10 to about 500 μm.

For example, the composite solid electrolyte including a lithium ion conductor as described above may be porous.

The composite solid electrolyte including a lithium ion conductor as described above may further include a crosslinkable polymer contained within, and filling, the pores thereof. The crosslinkable polymer may include, for example, an epoxy resin, an acryl resin, a polyamide resin, a polyimide resin, a polyimide amide resin, a polycarbonate resin, a polyester resin, a phenol resin, a polyurethane resin, and a melamine resin.

An amount of the crosslinkable polymer may be from about 0.01 weight percent (wt %) to about 20 wt %, or about 0.1 wt % to about 15 wt %, or for example, from about 0.01 wt % to about 10 wt %, based on a total weight of the composite solid electrolyte. When the amount of the crosslinkable polymer is within these ranges, permeation of liquid components and/or impurities into the composite solid electrolyte may be suppressed.

The composite solid electrolyte may have an ion conductivity of, for example, about $1 \times 10^{-4}$ Siemen per centimeter (S/cm) or greater at a temperature of about 25° C.

The composite solid electrolyte may have good resistance to reduction (i.e., resistant to reduction). For example, the composite solid electrolyte may have an interfacial resistance of, for example, about $1.0 \times 10^4$ ohms (Ω) to about $1.0 \times 10^5 \Omega$ with respect to an electrode of a lithium symmetric cell. In a lithium battery including the composite solid electrolyte, an interfacial resistance ($R_i$) between the negative electrode and the solid electrolyte of the lithium battery may be reduced. Without being limited by theory, it is believed that the reduced interfacial resistance is due to the coating layer including the silane compound of Formula 1 between the negative electrode and the solid electrolyte (lithium ion conductor). Due to good resistance to reduction of the composite solid electrolyte, the lithium battery may have improved ion conductivity and improved electrochemical stability.

Preparation Method of Composite Solid Electrolyte

According to another aspect, a method of preparing a composite solid electrolyte includes: providing a mixed solution including a silane compound represented by Formula 1a, a lithium ion conductor, and a solvent; stirring the mixed solution; and drying a stirred product. In an embodiment, the providing of the mixed solution may include mixing the silane compound represented by Formula 1a and a lithium ion conductor in a solvent to obtain the mixed solution.

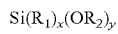

Formula 1a

In Formula 1a, x may be an integer satisfying 0≤x≤4; y may be an integer satisfying 0≤y≤4; x+y=4; and $R_1$ and $R_2$ may each independently be hydrogen, a halogen, a substituted or unsubstituted $C_1$-$C_{30}$ alkyl group, a substituted or unsubstituted $C_2$-$C_{30}$ alkenyl group, a substituted or unsubstituted $C_2$-$C_{30}$ alkynyl group, a substituted or unsubstituted $C_6$-$C_{30}$ aryl group, a substituted or unsubstituted $C_6$-$C_{30}$ aryloxy group, a substituted or unsubstituted $C_7$-$C_{30}$ aryl alkyl group, a substituted or unsubstituted $C_2$-$C_{30}$ heteroaryl group, a substituted or unsubstituted $C_2$-$C_{30}$ hetero aryloxy group, a substituted or unsubstituted $C_3$-$C_{30}$ heteroarylalkyl group, a substituted or unsubstituted $C_4$-$C_{30}$ carbocyclic group, a substituted or unsubstituted $C_5$-$C_{30}$ carbocyclic alkyl group, a substituted or unsubstituted $C_2$-$C_{30}$ heterocyclic group, or a substituted or unsubstituted $C_2$-$C_{30}$ heterocyclic alkyl group.

Non-limiting examples of the silane compound of Formula 1a may include 3-methacryloxypropylmethoxysilane, 3-methacryloxypropyltriethoxysilane, 3-methacryloylpropyltriethoxysilane, vinyltrimethoxysilane, vinyltriethoxysilane, isobutyltrimethoxysilane, 3-aminopropyltrimethoxysilane, 3-aminopropyltriethoxysilane, N-2-(aminoethyl)-3-aminopropyltrimethoxysilane, N-2-(aminoethyl)-3-aminopropyltriethoxysilane, N-2-(aminoethyl)-3-aminopropylmethyldimethoxysilane, N-2-(aminoethyl)-3-aminopropylmethyldiethoxysilane, 3-glycidyloxypropyltrimethoxysilane, 3-glycidyloxypropyltriethoxysilane, 3-mercaptopropyltrimethoxysilane, 3-mercaptopropyltriethoxysilane, 3-mercaptopropylmethyldimethoxysilane, 3-mercaptopropyltriethoxysilane, 3-isocyanatopropyltriethoxysilane, 3-isocyanatopropyltrimethoxysilane, 2-(3,4-epoxycyclohexyl)-ethyltrimethoxysilane, 2-(3,4-epoxycyclohexyl)-ethyltrimethoxysilane, 2-(3,4-epoxycyclohexyl)-ethyltriethoxysilane, 3-glycidoxylpropylmethyldiethoxysilane, 3-glycidoxylpropylmethyldimethoxysilane, para-styryltrimethoxysilane, para-styryltriethoxysilane, 3-methacryloxypropylmethyldimethoxysilane, 3-methacryloxypropylmethyldiethoxysilane, 3-acryloxypropyltrimethoxysilane, 3-acryloxypropyltriethoxysilane, N-phenyl-3-aminopropyltrimethoxysilane, N-phenyl-3-aminopropyltriethoxysilane, 3-chloropropyltrimethoxysilane, 3-chloropropyltriethoxysilane, perfluorooctyltriethoxysilane, tridecafluorooctyltriethoxysilane, trifluoropropyltrimethoxysilane, heptadecafluorodecyltrimethoxysilane, heptadecafluorodecyltriisopropoxysilane, trimethylchlorosilane, triethylchlorosilane, and tert-butyldimethylchlorosilane. A combination comprising at least one of the foregoing may also be used.

For example, the silane compound of Formula 1a may be tert-butyldimethylchlorosilane represented by Formula 1-1.

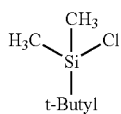

Formula 1-1

The lithium ion conductor may be obtained by thermally treating a mixture of a ceramic compound and an inorganic oxide, molding the resulting mixture in the form of a plate, and thermally treating the mold product.

The ceramic compound may include, for example, $Li_{1.3}Al_{0.3}Ge_{1.7}(PO_4)_3$, $Li_{1.4}Al_{0.4}Ge_{1.6}(PO_4)_3$, $Li_{1.5}Al_{0.5}Ge_{1.5}(PO_4)_3$, $Li_{1.6}Al_{0.6}Ge_{1.4}(PO_4)_3$, or $Li_{1.7}Al_{0.7}Ge_{1.3}(PO_4)_3$. A combination comprising at least one of the foregoing may also be used.

The inorganic oxide may include, for example, $TiO_2$, $ZnO_2$, $GeO_2$, $SiO_2$, or a combination thereof.

The inorganic oxide may be added to the ceramic compound, and then thermally treated to dope the ceramic compound.

An amount of the inorganic oxide may be about 1 to about 10 wt %, for example, 2 to about 6 wt %, based on a total weight of the ceramic compound. The thermal treating may be performed by calcining at a temperature of about 800° C. or greater.

The molding of the mixture in the form of a plate to form the lithium ion conductor is not limited to a specific method, and may be performed by, for example, casting, tape casting, embossing, or injection molding.

The lithium ion conductor may be, for example, a porous ceramic compound. In this regard, the method of preparing a composite solid electrolyte may further include filling pores of the lithium ion conductor with a crosslinkable polymer as listed above.

Next, a silane compound represented by Formula 1a and a lithium ion conductor prepared as described above may be mixed in a solvent to obtain a mixed solution, followed by stirring and drying the mixed solution, thereby preparing the composite solid electrolyte including the lithium ion conductor and a coating layer including the silane compound.

An amount of the silane compound may be about 0.1 to about 20 parts by weight, or about 0.1 part to about 15 parts by weight, or for example, 0.1 part to about 10 parts by weight, based on 100 parts by weight of the lithium ion conductor. When the amount of the silane compound represented by Formula 1a is within these ranges, the composite solid electrolyte may have improved resistance to reduction and improved ion conductivity.

The solvent may be any solvent which may dissolve the silane compound. For example, the solvent may be an organic solvent such as benzene, toluene, xylene, monochlorobenzene, dichlorobenzene, cyclohexanol, benzyl alcohol, phenol, cresol, anisole, acetal, ethyl acetate, propyl acetate, butyl acetate, methyl ethyl ketone, methyl isobutyl ketone, hexane, heptane, cyclohexane, chloroform, dichloromethane, or a combination thereof.

For example, an amount of the silane compound dissolved in the solvent may be about 0.1 wt % to about 10 wt %, and in some embodiments, about 0.3 wt % to about 7 wt %, and in some other embodiments, about 0.3 wt % to about 5 wt %, based on a total weight of the solvent.

For example, the stirring may be performed for about 1 day to about 5 days, and in some embodiments, for about 1 day to about 3 days, and in some embodiments, for about 3 days. After the stirring, the resulting lithium ion conductor mixed product may be sufficiently washed, and dried, thereby preparing the lithium ion conductor having a coating layer including a silane compound of Formula 1 as described above. The drying may be performed in a vacuum oven at about 50° C. to about 80° C., for example, at about 60° C. to about 70° C., for about 20 minutes to about 50 minutes.

Lithium Battery

According to another aspect, a lithium battery includes: a positive electrode; a negative electrode including a lithium metal or a lithium alloy; and a composite solid electrolyte according to any of the above-described embodiments disposed between the positive electrode and the negative electrode.

Figure 1:
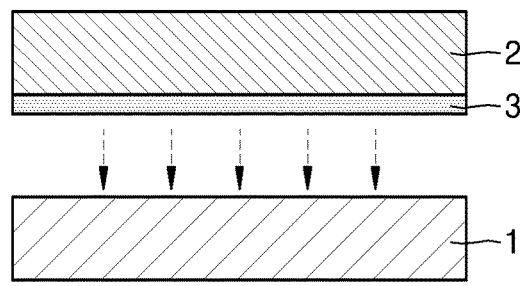
FIG. 1 is a schematic view illustrating a structure of a composite solid electrolyte, according to an embodiment, being disposed in contact with a lithium electrode.

Referring to FIG. 1, a lithium battery according to an embodiment may include: a negative electrode 1 including a lithium metal or a lithium alloy; and a composite solid electrolyte according to any of the above-described embodiments, including a lithium ion conductor 2 and a coating layer 3, wherein the coating layer 3 of the composite solid electrolyte, including a silane compound, may be arranged to be in contact with the negative electrode 1.

The coating layer 3 of the composite solid electrolyte, including a silane compound represented by Formula 1, may serve as a protective film for the negative electrode 1 between the lithium ion conductor 2 and the negative electrode 1.

A lithium battery according to another embodiment may include a negative electrode, a composite solid electrolyte according to any of the above-described embodiments, and a positive electrode.

Figure 2A:
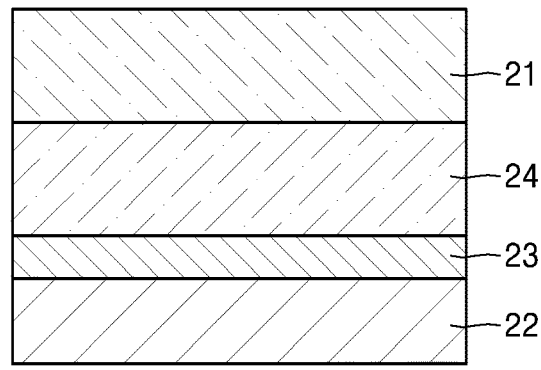
FIG. 2A is a schematic view illustrating a structure of a lithium battery according to an embodiment.

Referring to FIG. 2A, a lithium battery according to an embodiment may include: a negative electrode 22; a composite solid electrolyte 23 according to any of the above-described embodiments disposed on the negative electrode 22, having a coating layer including a silane compound of Formula 1 serving as a protective film for the negative electrode 22.

In some embodiments, the lithium battery may further include an intermediate layer 24 between the negative electrode 22 and the positive electrode 21.

The lithium battery may include a two-layered stack structure including the composite solid electrolyte 23 and the intermediate layer 24 which are stacked in this stated order on the negative electrode 22. For example, the lithium battery may have a stack structure of negative electrode/ composite solid electrolyte/intermediate layer/positive electrode stacked upon one another in the stated order, or a stack structure of negative electrode/intermediate layer/composite solid electrolyte/positive electrode stacked upon one another in the stated order.

Figure 2B:
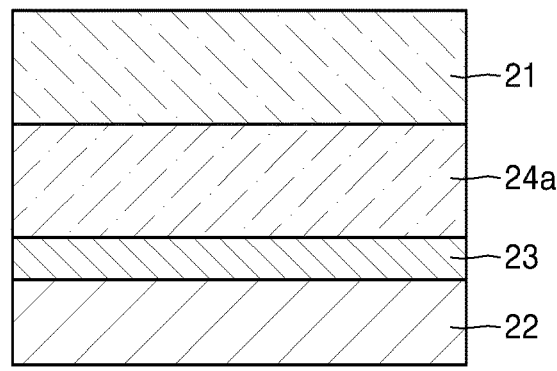
FIG. 2B is a schematic view illustrating a structure of a lithium battery according to another embodiment

For example, the intermediate layer 24 may be a separator 24a, as illustrated in FIG. 2B.

The separator 24a may be a single layer of polyethylene, polypropylene, or polyvinylidene fluoride, or multiple layers of at least two of these materials. Also, the separator 24a may be a mixed multi-layer, such as two layers of polyethylene/polypropylene, three layers of polyethylene/polypropylene/polyethylene, three layers of polypropylene/polyethylene/polypropylene, or the like. The separator 24a may further include an electrolyte including a lithium salt and an organic solvent.

The intermediate layer 24 may include a separator, a second electrolyte, or a combination thereof. For example, the intermediate layer 24 may include the separator 24a and a liquid electrolyte.

The liquid electrolyte may include a solvent and a lithium salt. The solvent may further include an aprotic solvent, water, or a combination thereof.

The aprotic solvent may be, for example, a carbonate solvent, an ester solvent, an ether solvent, a ketone solvent, an amine solvent, or a phosphine solvent.

Non-limiting examples of the carbonate solvent may include dimethyl carbonate (DMC), diethyl carbonate (DEC), ethyl methyl carbonate (EMC), dipropyl carbonate (DPC), methyl propyl carbonate (MPC), ethyl propyl carbonate (EPC), methyl ethyl carbonate (MEC), ethylene carbonate (EC), propylene carbonate (PC), and butylene carbonate (BC). A combination comprising at least one of the foregoing may also be used.

Non-limiting examples of the ester solvent may include methyl acetate, ethyl acetate, n-propyl acetate, dimethyl acetate, methyl propionate, ethyl propionate, γ-butyrolactone, decanolide, valerolactone, mevalonolactone, and caprolactone. A combination comprising at least one of the foregoing may also be used.

Non-limiting examples of the ether solvent may include dibutyl ether, tetraglyme, diglyme, dimethoxyethane, 2-methyl tetrahydrofuran, and tetrahydrofuran. The ketone solvent may be, for example, cyclohexanone or the like. A combination comprising at least one of the foregoing may also be used.

In addition, the amine solvent may be triethylamine, triphenylamine, or the like. The phosphine solvent may be, for example, triethylphosphine or the like. However, the solvent is not particularly limited to the above examples and any suitable aprotic solvent may be used.

Non-limiting examples of the aprotic solvent may include nitriles represented by R—CN (wherein R may be a linear, branched, or cyclic hydrocarbon group having 2 to 20 carbon atoms), or amides such as dimethyl formamide, dioxolanes such as 1,3-dioxolane, and sulfolanes.

The above-listed aprotic solvents may be used alone or as a combination thereof. A ratio of two or more of these solvents may be appropriately adjusted according to the desired performance of the battery to be manufactured, and may be determined by the person of skill in the art without undue experimentation.

In some embodiments, the liquid electrolyte may include an ionic liquid, if desired.

The ionic liquid may be a compound including a cation such as a linear or branched substituted ammonium, imidazolium, pyrrolidinium or piperidinium and an anion such as $PF_6^-$, $BF_4^-$, $CF_3SO_3^-$, $(CF_3SO_2)_2N^-$, $(C_2F_5SO_2)_2N^-$, $(C_2F_5SO_2)_2N^-$, $(CN)_2N^-$, or the like.

The lithium battery may be, for example, a lithium metal battery or a lithium air battery.

Figure 3:
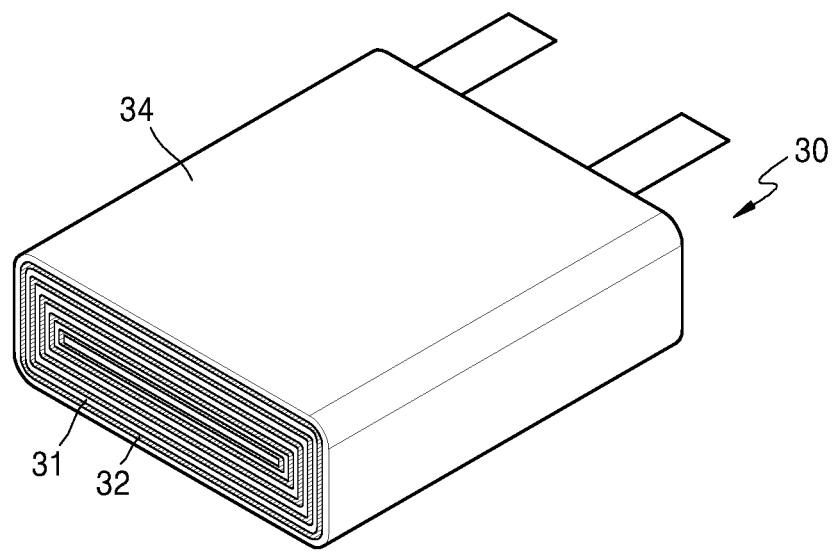
FIG. 3 is a schematic view illustrating a structure of a lithium metal battery as a lithium battery according to an embodiment.

FIG. 3 is a schematic view illustrating a structure of a lithium metal battery 30 according to an embodiment.

Referring to FIG. 3, the lithium metal battery 30 may include a positive electrode 31, a negative electrode 32, and a battery case 34 accommodating the positive electrode 31 and the negative electrode 32.

The negative electrode 32 may be a negative electrode including a lithium metal or a lithium alloy.

The positive electrode 31 may be fabricated by coating a positive active material on a surface of a positive current collector made of, for example, aluminum (Al). In another embodiment, the positive electrode 31 may be manufactured by casting a positive active material on a separate support to form a positive active material film. This positive active material film may be separated from the support and then laminated on a current collector.

The positive active material may be a compound capable of intercalating and deintercalating lithium, inorganic sulfur (Sa), or a sulfur compound.

The compound capable of intercalating/deintercalating lithium may be, for example, a compound represented by any one of the following formulae: $Li_aA_{1-b}B'_bD'_2$ (wherein $0.90 \leq a \leq 1.8$ and $0 \leq b \leq 0.5$); $Li_aE_{1-b}B'_bO_{2-c}D'_c$ (wherein $0.90 \leq a \leq 1.8$, $0 \leq b \leq 0.5$, and $0 \leq c \leq 0.05$); $LiE_{2-b}B'_bO_{4-c}D'_c$ (wherein $0 \leq b \leq 0.5$ and $0 \leq c \leq 0.05$); $Li_aNi_{1-b-c}Co_bB'_cD'_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cD'_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$ and $0.001 \leq b \leq 0.1$); $Li_aCoG_bO_2$ (wherein $0.90 \leq a \leq 1.8$ and $0.001 \leq b \leq 0.1$); $Li_aMnG_bO_2$ (wherein $0.90 \leq a \leq 1.8$ and $0.001 \leq b \leq 0.1$); $Li_aMn_2G_bO_4$ (wherein $0.90 \leq a \leq 1.8$ and $0.001 \leq b \leq 0.1$); $QO_2$; $QS_2$; $LiQS_2$; $V_2O_5$; $LiV_2O_5$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$. A combination comprising at least one of the foregoing may also be used.

In the formulae above, A may be nickel (Ni), cobalt (Co), manganese (Mn), or a combination thereof; B' may be Al, Ni, Co, Mn, chromium (Cr), iron (Fe), magnesium (Mg), strontium (Sr), vanadium (V), a rare earth element, or a combination thereof; D' may be oxygen (O), fluorine (F), sulfur (S), phosphorous (P), or a combination thereof; E may be Co, Mn, or a combination thereof; F' may be F, S, P, or a combination thereof; G is Al, Cr, Mn, Fe, Mg, lanthanum (La), cerium (Ce), Sr, V, or a combination thereof; Q may be Ti, molybdenum (Mo), Mn, or a combination thereof; I' may be Cr, V, Fe, scandium (Sc), yttrium (Y), or a combination thereof; and J may be V, Cr, Mn, Co, Ni, copper (Cu), or a combination thereof.

The sulfur compound may be, for example, a sulfide compound, an organic sulfur compound, a carbon-sulfur polymer, or a combination thereof. Non-limiting examples of the sulfide compound may include $Li_2S_n$ (wherein n=1), 2,5-dimercapto-1,3,4-thiadiazole, and 1,3,5-trithiocyanuric acid. The carbon-sulfur polymer may be, for example, $C_2S_x$ (wherein x=2.5 to 50).

The positive active material may further include a binder and a conducting agent.

Examples of the binder may include polyethylene, polypropylene, polytetrafluoroethylene (PTFE), polyvinylidene fluoride (PVDF), styrene-butadiene rubber, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoro ethylene copolymer, and an ethylene-acrylic acid copolymer, which may be used alone or in combination. However, embodiments are not limited thereto. Any material suitable for use as a binder available may be used.

Examples of the conducting agent may include carbon black, graphite particulates, natural graphite, artificial graphite, acetylene black, Ketjen black, carbon fibers; carbon nanotubes; metallic powders, fibers or tubes formed of copper, nickel, aluminum, or silver; and conductive polymers such as polyphenylene derivatives. However, embodiments are not limited thereto. For example, any suitable conducting agent may be used. A combination comprising at least one of the foregoing may also be used.

In some embodiments, the positive electrode 31 may be a positive electrode including a sulfur-containing or organic sulfur-free positive electrode and a catholyte prepared by adding a sulfur-containing positive active material to an electrolyte.

A composite solid electrolyte according to any of the above-described embodiments may be between the negative electrode 32 and the positive electrode 31. In some embodiments, the lithium metal battery 30 may include an intermediate layer between the positive electrode 31 and the composite solid electrolyte. The intermediate layer may include a separator, a second electrolyte, or a combination thereof. The second electrolyte may include a liquid electrolyte, a polymer electrolyte, or a combination thereof. For example, the lithium metal battery 30 may have a stack structure of negative electrode/composite solid electrolyte/intermediate layer/positive electrode stacked upon one another in the stated order, or a stack structure of negative electrode/intermediate layer/composite solid electrolyte/positive electrode stacked upon one another in the stated order.

The liquid electrolyte may include a non-aqueous organic solvent and a lithium salt. The non-aqueous organic solvent may be a single solvent or a mixture of two or more organic solvents. When using a mixture of two or more organic solvents, at least one solvent may include a weak polar solvent, a strong polar solvent, a lithium metal protecting solvent, or a combination thereof.

The weak polar solvent may be defined as a solvent having a dielectric constant of less than 15 and capable of dissolving a sulfur atom. The weak polar solvent include an aryl compound, a bicyclic ether, an acyclic carbonate, or a combination thereof.

The strong polar solvent may be defined as a solvent having a dielectric constant of greater than 15 and capable of dissolving lithium polysulfide. The strong polar solvent may include an acyclic carbonate, a sulfoxide compound, a lactone compound, a ketone compound, an ester compound, a sulfate compound, a sulfite compound, or a combination thereof.

The lithium metal protecting solvent may be defined as a solvent having a charging/discharging cycle efficiency of 50% or greater and capable of forming a solid electrolyte interface (SEI) film stable against lithium metal. The lithium metal protecting salt may include a saturated ether compound, an unsaturated ether compound, a heterocyclic compound containing N, O, S, or a combination thereof.

For example, the weak polar solvent may be xylene, dimethoxyethane, 2-methyltetrahydrofuran, diethyl carbonate, dimethyl carbonate, toluene, dimethyl ether, diethyl ether, diglyme, tetraglyme, or the like, or a combination thereof.

For example, the strong polar solvent may be hexamethyl phosphoric triamide, γ-butyrolactone, acetonitrile, ethylene carbonate, propylene carbonate, N-methylpyrrolidone, 3-methyl-2-oxazolidone, dimethyl formamide, sulfolane, dimethyl acetamide, dimethyl sulfoxide, dimethyl sulfate, ethylene glycol diacetate, dimethyl sulfite, ethylene glycol sulfite, or the like, or a combination thereof.

For example, the lithium protecting solvent may be tetrahydrofuran, ethylene oxide, dioxolane, 3,5-dimethyl isoxazole, 2,5-dimehtyl furan, furan, 2-methyl furan, 1,4-oxane, 4-methyldioxolane, or the like, or a combination thereof.

For example, the lithium salt may include lithium trifluoromethansulfonimide, lithium triflate, lithium perchlorate, $LiPF_6$, $LiBF_4$, tetraalkylammonium such as tetrabutylammonium tetrafluoroborate, or a salt which is liquid at room temperature, for example, an imidazolium salt such as 1-ethyl-3-methylimidazolium bis-(perfluoroethyl sulfonyl) imide. A combination comprising at least one of the foregoing may also be used. The concentration of the lithium salt in the electrolyte may be from about 0.1 M to about 2.0 M.

The lithium metal battery 30 may be manufactured as a unit battery having a structure of positive electrode/separator/negative electrode, a bicell having a structure of positive electrode/separator/negative electrode/separator/positive electrode, or a stacked battery in which multiple unit batteries are repeatedly stacked upon one another.

Figure 4:
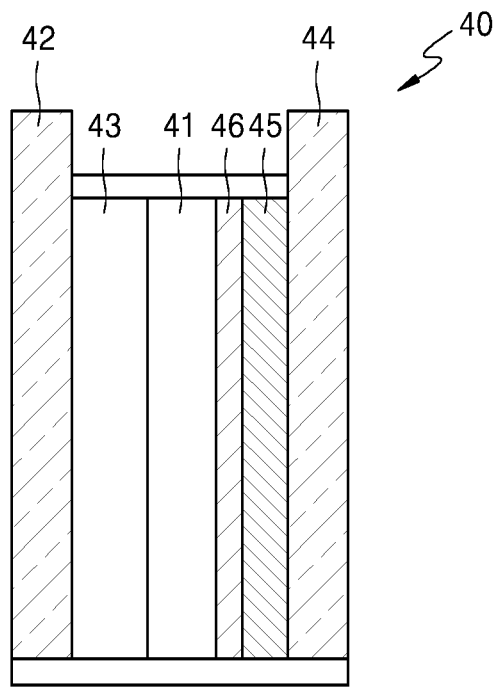
FIG. 4 is a schematic view illustrating a structure of a lithium metal air battery according to another embodiment.

FIG. 4 is a schematic view illustrating a structure of a lithium air battery 40 according to an embodiment.

Referring to FIG. 4, the lithium air battery 40 may include: a positive electrode 43 formed using oxygen as an active material on a first current collector 42; a negative electrode 45 adjacent to a second current collector 44, the negative electrode 45 including a lithium metal or a lithium alloy; a coating layer 46 including a silane compound of Formula 1; and a lithium ion conductor 41, the coating layer 46 and the lithium ion conductor 41 together constituting a composite solid electrolyte according to any of the above-described embodiments.

An intermediate layer (not shown) may be between the positive electrode 43 and the negative electrode 45. The intermediate layer may include a liquid electrolyte including a non-aqueous solvent and a lithium salt, an inorganic solid electrolyte membrane, a polymer solid electrolyte membrane, a gel-type polymer electrolyte membrane, a separator, or a combination thereof.

The lithium air battery 40 may have, for example, a stack structure of negative electrode/composite solid electrolyte/intermediate layer/positive electrode stacked upon one another in the stated order, or a stack structure of negative electrode/intermediate layer/composite solid electrolyte/positive electrode stacked upon one another in the stated order.

The liquid electrolyte and the separator may be the same as those listed above. The inorganic solid electrolyte membrane may be the same as the above-described lithium ion conductive solid electrolyte. The polymer solid electrolyte may be, for example, a lithium salt-doped polyethylene oxide. For example, the lithium salt may be, for example, $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, or $LiAlCl_4$.

The polymer solid electrolyte membrane may form a stacked structure together with, for example, a glass-ceramic composite. The glass-ceramic composite film may be disposed between two polymer solid electrolyte membranes.

The inorganic solid electrolyte membrane or the polymer solid electrolyte membrane may have a thickness from about 1 μm to about 200 μm.

A catalyst for oxidation and reduction of oxygen may be added to the positive electrode 43. Examples of the catalyst may include precious metal-based catalysts such as platinum, gold, silver, palladium, ruthenium, rhodium, and osmium; oxide-based catalysts such as a manganese oxide, an iron oxide, a cobalt oxide, and a nickel oxide; and an organic metal-based catalyst such as cobalt phthalocyanine. However, embodiments are not limited thereto. Any suitable catalyst for oxidation and reduction of oxygen may be used.

The catalyst may be supported on a catalyst support. The catalyst support may be an oxide, a zeolite, a clay-based mineral, carbon, or the like, or a combination thereof. The oxide may include alumina, silica, zirconium oxide, titanium dioxide, or a combination thereof. The oxide may be an oxide including a metal selected from cerium (Ce), praseodymium (Pr), samarium (Sm), europium (Eu), terbium (Tb), thulium (Tm), ytterbium (Yb), antimony (Sb), bismuth (Bi), vanadium (V), chromium (Cr), manganese (Mn), iron (Fe), cobalt (Co), nickel (Ni), copper (Cu), niobium (Nb), molybdenum (Mo), tungsten (W), or a combination thereof. Examples of the carbon may include carbon blacks such as Ketjen black, acetylene black, channel black, and lamp black; graphites such as natural graphite, artificial black, and expandable graphite; activated carbons; and carbon fibers, or a combination thereof. However, embodiments are not limited thereto. Any suitable catalyst support may be used.

The positive electrode 43 may further include a binder. The binder may include any binder as described above which is suitable for use in a lithium battery.

In an embodiment, the positive electrode 43 may be manufactured by preparing a positive electrode slurry by mixing a catalyst for oxidation/reduction of oxygen, a conducting agent, and a binder together and adding an appropriate solvent thereto; coating a surface of a current collector with the positive electrode slurry; and drying the coated current collector, optionally followed by press-molding the current collector to improve electrode density. Optionally, the positive electrode 43 may include a lithium oxide. Also, the catalyst for oxidation/reduction of oxygen is optional and may or may not be used.

To rapidly diffuse oxygen, the first current collector 42 may have a porous structure in a net or mesh form or may be a porous metal plate made of stainless steel, nickel, aluminum, or the like. However, embodiments are not limited thereto. The first current collector 42 may be any current collector suitable for a lithium battery. For example, the first current collector 42 may be coated with an oxidation-resistant metal or metal alloy in order to prevent the first current collector 42 from being oxidized.

The second current collector 44 may be any current collector having conductivity. For example, the second current collector 44 may be made of stainless steel, nickel, aluminum, iron, titanium, carbon, or the like. For example, the second current collector 44 may have a foil, plate, mesh or grid shape, more particularly, a mesh shape. The mesh shape has a high current collecting efficiency and thus is suitable for use as the second current collector 44.

The term "air" as used herein is not limited to atmospheric air, and may include a combination of gases including oxygen, or pure oxygen gas. This broad definition of "air" also applies to all applications, e.g., an air battery, an air positive electrode, and the like.

The lithium battery according to any of the above-described embodiments) may be either a lithium primary battery or a lithium secondary battery. The lithium battery may have various shapes, and in some embodiments, may have a coin, button, sheet, stack, cylinder, plane, or horn shape. The lithium battery may be used as a large-scale battery for electric vehicles and the like.

One or more embodiments of the present disclosure will now be described in detail with reference to the following examples. However, these examples are only for illustrative purposes and are not intended to limit the scope of the one or more embodiments of the present disclosure.

EXAMPLES

Preparation Example 1: Preparation of Composite Solid Electrolyte $Li_{1+x+y}Al_xTi_{2-x}Si_yP_{3-y}O_{12}$ (wherein x=0.5 and y=0.5) (LATP) as a lithium ion conductor in powder form was placed into a press and then pressed into a plate having a size of about 1.5 cm×1.5 cm. This LATP plate was soaked in a mixed solution of 10 milliliters (mL) of toluene, 60 microliters (μL) of tert-butyldimethylchlorosilane, and 50 milligrams (mg) of imidazole and stirred for about 3 days. The lithium ion conductor was removed from the mixed solution, sufficiently washed with distilled water and further washed using an ultrasonic washer for about 5 minutes, and then dried in a vacuum oven at about 65° C. for about 30 minutes. As a result, a plate-type composite solid electrolyte including the lithium ion conductor having a 2 nm-thick coating layer including the silane compound was obtained.

Preparation Example 2: Preparation of Composite Solid Electrolyte

A composite solid electrolyte was prepared in the same manner as described in Preparation Example 1, except that (3-mercaptopropyl)trimethoxysilane compound was used instead of tert-butyldimethylchlorosilane, and the imidazole used in Preparation Example 1 was not used.

Preparation Example 3: Preparation of Composite Solid Electrolyte

A composite solid electrolyte was prepared in the same manner as in Preparation Example 1, except that isobutyl-trimethoxysilane compound was used instead of tert-butyldimethylchlorosilane, and the imidazole used in Preparation Example 1 was not used.

Preparation Example 4: Preparation of Composite Solid Electrolyte

A composite solid electrolyte was prepared in the same manner as described in Preparation Example 1, except that perfluorooctyltriethoxysilane compound was used instead of tert-butyldimethylchlorosilane, and the imidazole used in Preparation Example 1 was not used.

Preparation Example 5: Preparation of Composite Solid Electrolyte

A composite solid electrolyte was prepared in the same manner as in Preparation Example 1, except that 3-methacryloylpropyltrimethoxysilane compound was used instead of tert-butyldimethylchlorosilane, and the imidazole used in Preparation Example 1 was not used.

Preparation Example 6: Preparation of Solid Electrolyte $Li_{1+x+y}Al_xTi_{2-x}Si_yP_{3-y}O_{12}$ (wherein x=0.5 and y=0.5) (LATP) as a lithium ion conductor in powder form was placed into a press and then pressed into a plate having a size of about 1.5 cm×1.5 cm. This plate was used as a solid electrolyte.

Example 1: Manufacture of Lithium Symmetric Cell

Figure 5:
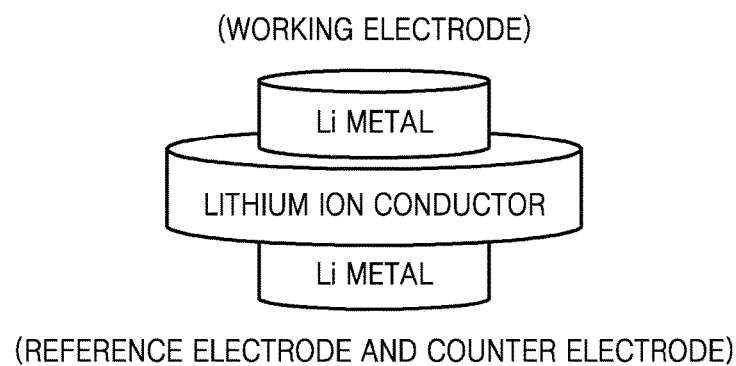
FIG. 5 is a schematic view of a lithium symmetrical cell according to an embodiment.

To evaluate resistance to reduction, interfacial resistance and charge-discharge characteristics of the composite solid electrolyte of Preparation Example 1, a Li symmetric cell having a structure of Li/solid electrolyte/Li was manufactured. In particular, after Li metal was placed on opposite surfaces of the composite solid electrolyte of Preparation Example 1, respectively, the resulting structure was bound together by pressing while a SUS plate was placed thereon, thereby manufacturing a lithium symmetric cell. A structure of the lithium symmetric cell is shown in FIG. 5.

Examples 2 to 5: Manufacture of Lithium Symmetric Cell

Lithium symmetric cells were manufactured in the same manner as in Example 1, except that the composite solid electrolytes of Preparation Example 2, Preparation Example 3, Preparation Example 4, and Preparation Example 5, were used, respectively, instead of the composite solid electrolyte of Preparation Example 1.

Comparative Example 1: Manufacture of Lithium Symmetric Cell

A lithium symmetric cell was manufactured in the same manner as in Example 1, except that the solid electrolyte of Preparation Example 6, instead of the composite solid electrolyte of Preparation Example 1 was used.

Evaluation Example 1: Surface Composition Analysis of Composite Solid Electrolyte Surface composition analysis of the composite solid electrolytes of Preparation Examples 1 to 6 was performed by X-ray photoelectron spectroscopy (XPS). The results are shown in FIG. 6.

Figure 6:
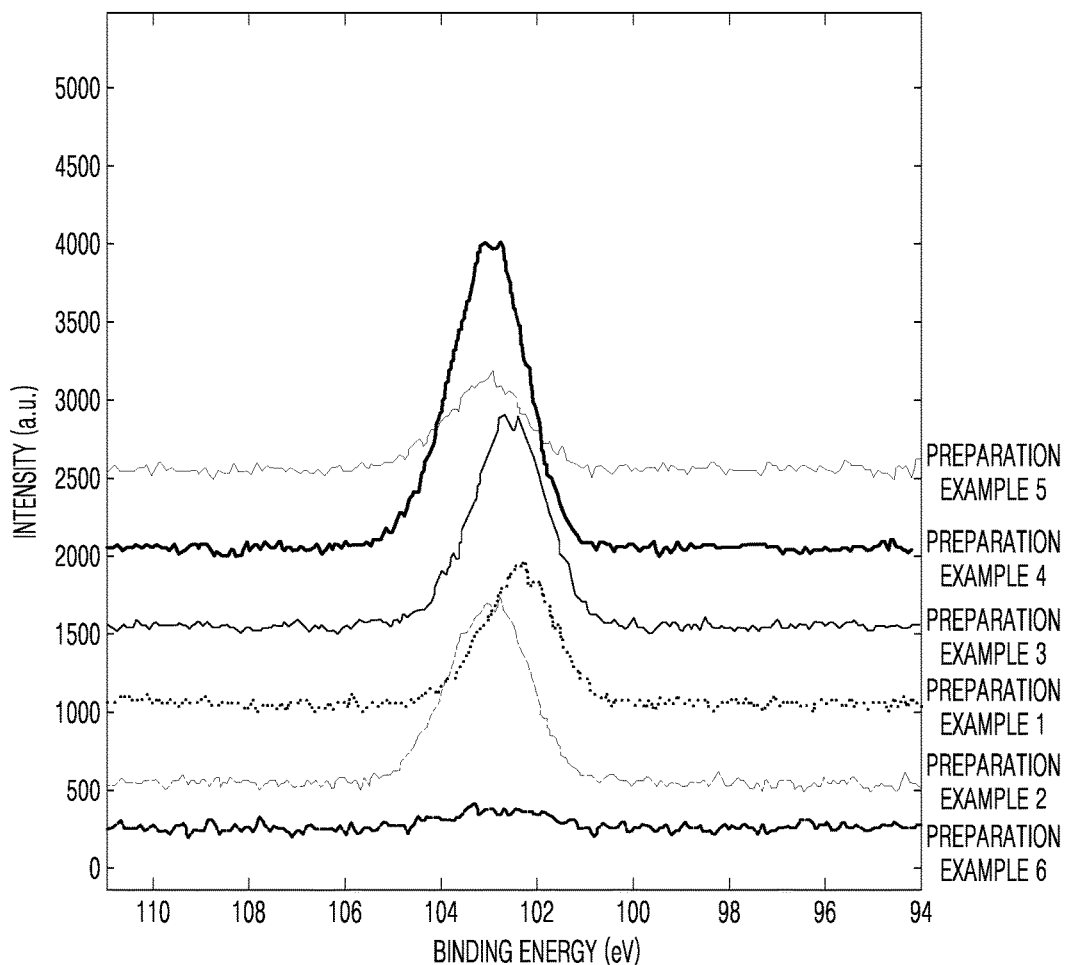
FIG. 6 is a graph of intensity (arbitrary units, a.u.) versus binding energy (electron volts, eV), which illustrates X-ray photoelectron spectroscopy (XPS) spectra of composite solid electrolytes prepared according to Preparation Examples 1 to 6.

Referring FIG. 6, the composite solid electrolytes of Preparation Examples 1 to 5 were found to exhibit a sharp peak at about 103 electron volts (eV) originating from Si—O bond, while the solid electrolyte of Preparation Example 6 did not exhibit a peak.

These results indicate that the surface of each of the composite solid electrolytes of Preparation Examples 1 to 5 was coated with a silane compound.

Evaluation Example 2: Analysis of Reduction Resistance of Composite Solid Electrolyte 2-1. CV Evaluation Reduction resistance of each of the composite solid electrolytes of Preparation Example 1, Preparation Example 2, and Preparation Example 6 was analyzed by cyclic voltammetry (CV) at a rate of about 1 millivolts per second (mV/s) with respect to platinum (Pt) as a working electrode and lithium (Li) metal as a reference electrode and a counter electrode. The results are shown in FIG. 7

Figure 7:
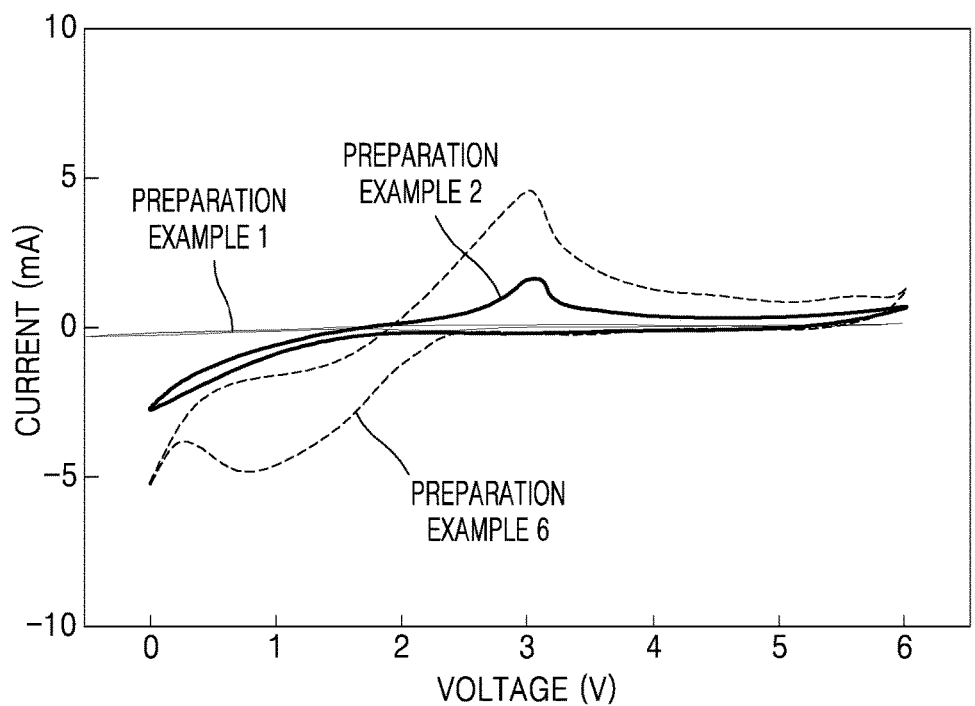
FIG. 7 is a graph of current (milliampere, mA) versus voltage (V), which illustrates cyclic voltammetry (CV)

Referring to FIG. 7, the composite solid electrolytes of Preparation Examples 1 and 2, each surface coated with a silane compound, nearly did not exhibit a reduction peak, while the solid electrolyte of Preparation Example 6 exhibited a large reduction peak.

These results indicate that the composite solid electrolytes of Example 1 and 2 have a resistance to reduction due to the surface-coated silane compounds. Resistance reduction characteristics of the composite solid electrolytes, including the lithium ion conductor 41 and the coating layer 46, are schematically illustrated in FIG. 8.

2-2. Evaluation of Interfacial Resistance Reduction

Interfacial resistance analysis of the lithium symmetric cells (having a structure of Li/solid electrolyte/Li) of Examples 1 and 2 and Comparative Example 1 was performed. The results are shown in FIG. 9.

Referring to FIG. 9, the lithium symmetric cell of Comparative Example 1, including the solid electrolyte without a silane compound coating layer, was found to have a high initial resistance of about $2.1 \times 10^5$ ohm ($\Omega$), which continuously increased over time, and in particular, showed a sharp increase in resistance after 12 hours. Meanwhile, the lithium symmetric cells of Examples 1 and 2, including the composite solid electrolytes of Preparation Examples 1 and 2, respectively, each surface-coated with a silane compound, were found to have a low initial resistance of about $2.0 \times 10^4 \Omega$ and about $1.6 \times 10^4 \Omega$, respectively, without a resistance increase with increasing charging time.

These results indicate that the lithium symmetric cells of Examples 1 and 2 suppress interfacial side reactions, due to the presence of the silane compound coating layer on the surface of the lithium ion conductor, and thus have reduced interfacial resistance.

Evaluation Example 3: Analysis of Charge-Discharge Characteristics

Charge and discharge characteristics of the lithium symmetric cells (having a structure of Li/solid electrolyte/Li) of Example 1, Example 2, and Comparative Example 1 were analyzed at a cutoff voltage of about −2V to about 2V and a current density of about 0.03 mAh (Example 1 and Comparative Example 1) and 0.24 mAh (Example 2). The results are shown in FIG. 10.

Referring to FIG. 10, the lithium symmetric cell of Comparative Example 1, including the solid electrolyte of Preparation Example 6, i.e., without a silane compound coating layer, nearly did not exhibit charge-discharge cycle characteristics. Meanwhile, the lithium symmetric cells of Examples 1 and 2, including the composite solid electrolytes of Preparation Examples 1 and 2, respectively, each having a silane compound coating layer on the surface of a lithium ion conductor, had charge-discharge cycle characteristics. In particular, the lithium symmetric cell of Example 1 exhibited stable cycle characteristics over 10 cycles or longer.

These results indicate that the lithium symmetric cells of Examples 1 and 2 suppress the occurrence of an interfacial side reaction. Without being limited by theory, it is believed that the suppression of the interfacial side reaction is due to a silane compound coating layer on the surface of the lithium ion conductor, results in reduction resistance and thus improved charge-discharge cycle characteristics.

As described above, according to the one or more embodiments, in a lithium battery including a composite solid electrolyte according to any of the above-described embodiments, due to a silane compound coating layer introduced between a negative electrode and the solid electrolyte of the lithium battery, interfacial resistance ($R_i$) between the negative electrode and the solid electrolyte may be reduced, and reduction resistance may be improved. The lithium battery may also have improved ion conductivity and electrochemical stability.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:
1. A composite solid electrolyte, comprising:
a lithium ion conductor, and
a coating layer on the lithium ion conductor, the coating layer comprising a silane compound represented by Formula 1:

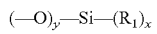

$$(-O)_y-Si-(R_1)_x \qquad \text{Formula 1}$$

wherein, in Formula 1,
x is an integer satisfying $1 \leq x \leq 3$; y is an integer satisfying $1 \leq y \leq 3$; $x+y=4$;
$R_1$ is each independently hydrogen, a halogen, a substituted or unsubstituted $C_1$-$C_{30}$ alkyl group, a substituted or unsubstituted $C_2$-$C_{30}$ alkenyl group, a substituted or unsubstituted $C_2$-$C_{30}$ alkynyl group, a substituted or unsubstituted $C_6$-$C_{30}$ aryl group, a substituted or unsubstituted $C_6$-$C_{30}$ aryloxy group, a substituted or unsubstituted $C_7$-$C_{30}$ arylalkyl group, a substituted or unsubstituted $C_2$-$C_{30}$ heteroaryl group, a substituted or unsubstituted $C_2$-$C_{30}$ heteroaryloxy group, a substituted or unsubstituted $C_3$-$C_{30}$ heteroarylalkyl group, a substituted or unsubstituted $C_4$-$C_{30}$ carbocyclic group, a substituted or unsubstituted $C_5$-$C_{30}$ carbocyclic alkyl group, a substituted or unsubstituted $C_2$-$C_{30}$ heterocyclic group, or a substituted or unsubstituted $C_2$-$C_{30}$ heterocyclic alkyl group.

2. The composite solid electrolyte of claim 1, wherein $R_1$ is each independently fluorine, a $C_1$-$C_{30}$ alkyl group substituted with fluorine, or a $C_6$-$C_{30}$ aryl group substituted with fluorine.

3. The composite solid electrolyte of claim 1, wherein a thickness of the coating layer is about 1 nanometer to about 100 nanometers.

4. The composite solid electrolyte of claim 1, wherein the lithium ion conductor comprises a lithium-lanthanum-titanium-oxide, a lithium-lanthanum-zirconium oxide, a lithium superionic conductor, a lithium-aluminum-titanium-phosphate, a lithium-aluminum-germanium-phosphate, or a combination thereof.

5. The composite solid electrolyte of claim 1, wherein the lithium ion conductor is a composite oxide represented by $Li_{1+x+y}Al_xTi_{2-x}Si_yP_{3-y}O_{12}$ wherein $0 \leq x \leq 1$, and $0 \leq y \leq 1$.

6. The composite solid electrolyte of claim 1, wherein the lithium ion conductor has an average particle diameter of about 0.1 micrometer to about 5 micrometers.

7. The composite solid electrolyte of claim 1, wherein a thickness of the composite solid electrolyte is about 10 micrometers to about 1000 micrometers.

8. The composite solid electrolyte of claim 1, wherein the composite solid electrolyte does not have a reduction peak as measured by cyclic voltammetry at a rate of about 1 millivolts per second.

9. The composite solid electrolyte of claim 1, wherein the composite solid electrolyte has an interfacial resistance of about $1.0 \times 10^4$ ohms to about $1.0 \times 10^5$ ohms with respect to an electrode of a lithium symmetrical cell.

10. A lithium battery comprising:
a positive electrode;
a negative electrode including a lithium metal or a lithium alloy; and
the composite solid electrolyte of claim 1 disposed between the positive electrode and the negative electrode.

11. The lithium battery of claim 10, wherein the coating layer comprising the silane compound in the composite solid electrolyte is in contact with the negative electrode.

12. The lithium battery of claim 10, further comprising an intermediate layer between the negative electrode and the positive electrode, the intermediate layer comprising a separator, a second electrolyte, or a combination thereof.

13. The lithium battery of claim 12, wherein the second electrolyte is a solid polymer electrolyte, an inorganic solid electrolyte, or a liquid electrolyte.

14. The lithium battery of claim 10, wherein the lithium battery is a lithium metal battery or a lithium air battery.

15. A method of preparing a composite solid electrolyte, the method comprising:
providing a mixed solution comprising a silane compound represented by Formula 1a, a lithium ion conductor, and a solvent;
stirring the mixed solution; and
drying the mixed solution:

$$Si(R_1)_x(OR_2)_y \qquad \text{Formula 1a}$$

wherein, in Formula 1a, x is an integer satisfying $0 \leq x \leq 4$; y is an integer satisfying $0 \leq y \leq 4$; $x+y=4$;

$R_1$ and $R_2$ are each independently hydrogen, a halogen, a substituted or unsubstituted $C_1$-$C_{30}$ alkyl group, a substituted or unsubstituted $C_2$-$C_{30}$ alkenyl group, a substituted or unsubstituted $C_2$-$C_{30}$ alkynyl group, a substituted or unsubstituted $C_6$-$C_{30}$ aryl group, a substituted or unsubstituted $C_6$-$C_{30}$ aryloxy group, a substituted or unsubstituted $C_7$-$C_{30}$ arylalkyl group, a substituted or unsubstituted $C_2$-$C_{30}$ heteroaryl group, a substituted or unsubstituted $C_2$-$C_{30}$ heteroaryloxy group, a substituted or unsubstituted $C_3$-$C_{30}$ heteroarylalkyl group, a substituted or unsubstituted $C_4$-$C_{30}$ carbocyclic group, a substituted or unsubstituted $C_5$-$C_{30}$ carbocyclic alkyl group, a substituted or unsubstituted $C_2$-$C_{30}$ heterocyclic group, or a substituted or unsubstituted $C_2$-$C_{30}$ heterocyclic alkyl group.

16. The method of claim 15, wherein the silane compound represented by Formula 1a comprises 3-methacryloxypropylmethoxysilane, 3-methacryloxypropyltriethoxysilane, 3-methacryloylpropyltriethoxysilane, vinyltrimethoxysilane, vinyltriethoxysilane, isobutyltrimethoxysilane, 3-aminopropyltrimethoxysilane, 3-aminopropyltriethoxysilane, N-2-(aminoethyl)-3-aminopropyltrimethoxysilane, N-2-(aminoethyl)-3-aminopropyltriethoxysilane, N-2-(aminoethyl)-3-aminopropylmethyldimethoxysilane, N-2-(aminoethyl)-3-aminopropylmethyldiethoxysilane, 3-glycidyloxypropyltrimethoxysilane, 3-glycidyloxypropyltriethoxysilane, 3-mercaptopropyltrimethoxysilane, 3-mercaptopropyltriethoxysilane, 3-mercaptopropylmethyldimethoxysilane, 3-mercaptopropylmethyldimethoxysilane, 3-mercaptopropyltriethoxysilane, 3-isocyanatopropyltriethoxysilane, 3-isocyanatopropyltrimethoxysilane, 2-(3,4-epoxycyclohexyl)-ethyltrimethoxysilane, 2-(3,4-epoxycyclohexyl)-ethyltrimethoxysilane, 2-(3,4-epoxycyclohexyl)-ethyltriethoxysilane, 3-glycidoxylpropylmethyldiethoxysilane, 3-glycidoxylpropylmethyldimethoxysilane, para-styryltrimethoxysilane, para-styryltriethoxysilane, 3-methacryloxypropylmethyldimethoxysilane, 3-methacryloxypropylmethyldiethoxysilane, 3-acryloxypropyltrimethoxysilane, 3-acryloxypropyltriethoxysilane, N-phenyl-3-aminopropyltrimethoxysilane, N-phenyl-3-aminopropyltriethoxysilane, 3-chloropropyltrimethoxysilane, 3-chloropropyltriethoxysilane, perfluorooctyltriethoxysilane, tridecafluorooctyltriethoxysilane, trifluoropropyltrimethoxysilane, heptadecafluorodecyltrimethoxysilane, heptadecafluorodecyltriisopropoxysilane, trimethylchlorosilane, triethylchlorosilane, tert-butyldimethylchlorosilane, or a combination thereof.

17. The method of claim 15, wherein the silane compound represented by Formula 1a is tert-butyldimethylchlorosilane.

18. The method of claim 15, wherein an amount of the silane compound is about 0.1 part by weight to about 20 parts by weight based on 100 parts by weight of the lithium ion conductor.

19. The method of claim 15, wherein the solvent comprises benzene, toluene, xylene, monochlorobenzene, dichlorobenzene, cyclohexanol, benzyl alcohol, phenol, cresol, anisole, acetal, ethyl acetate, propyl acetate, butyl acetate, methyl ethyl ketone, methyl isobutyl ketone, hexane, heptane, cyclohexane, chloroform, dichloromethane, or a combination thereof.

20. The method of claim 15, wherein the drying is performed at about 50° C. to about 80° C.

* * * * *